Dec. 17, 1968    J. W. REESOR    3,416,340
AUTOMATIC CONTROL AND INDICATING SYSTEMS FOR ROLLER LEVELERS
Filed June 8, 1966    3 Sheets-Sheet 1
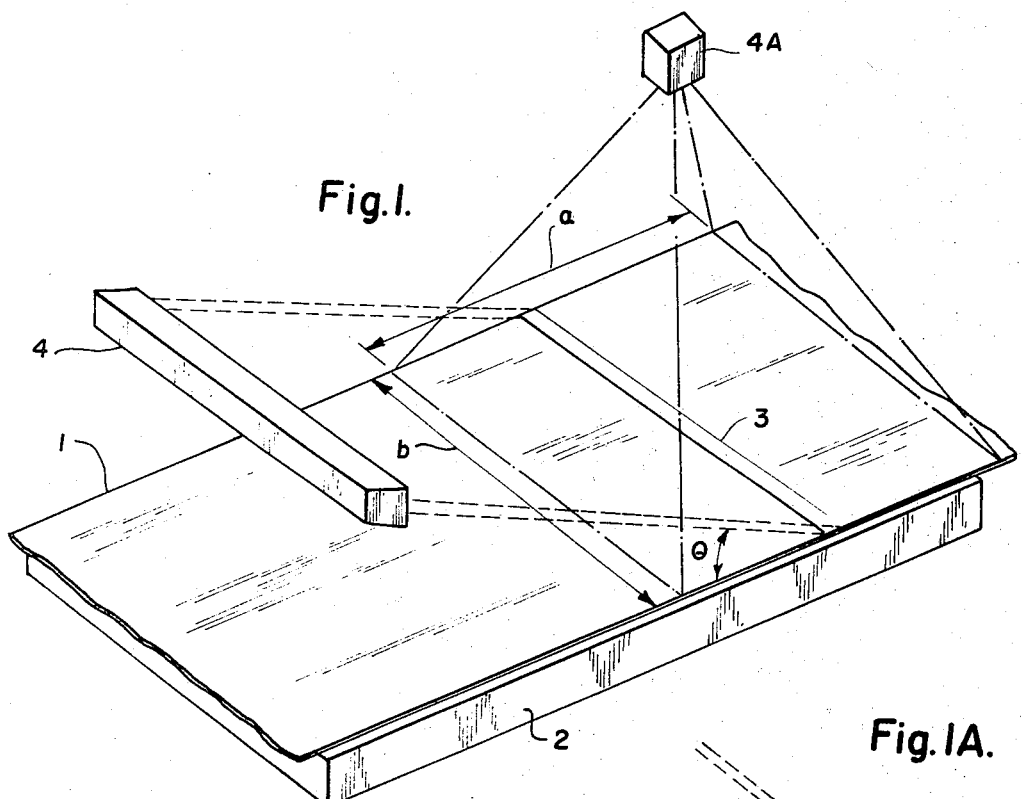
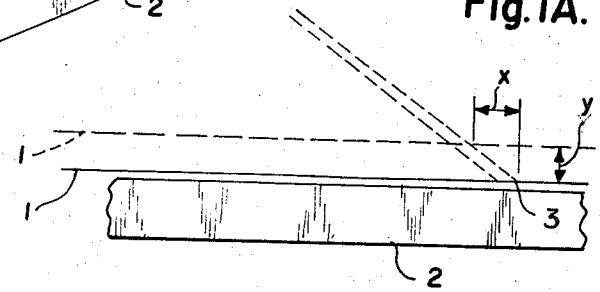
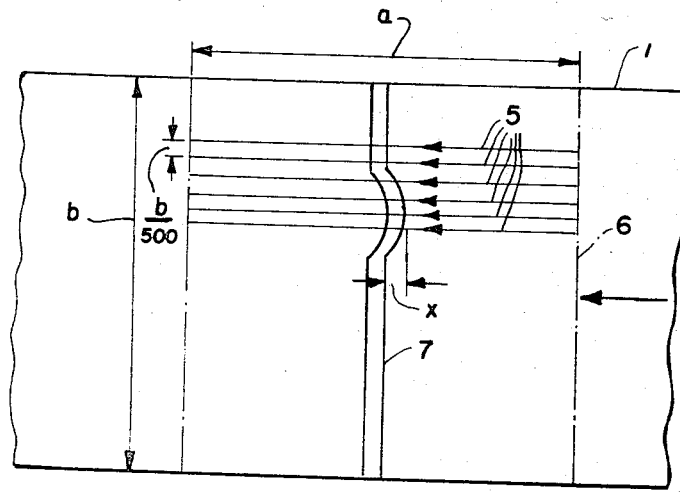
INVENTOR.
JAMES W. REESOR
BY
William J. Ruano
his ATTORNEY

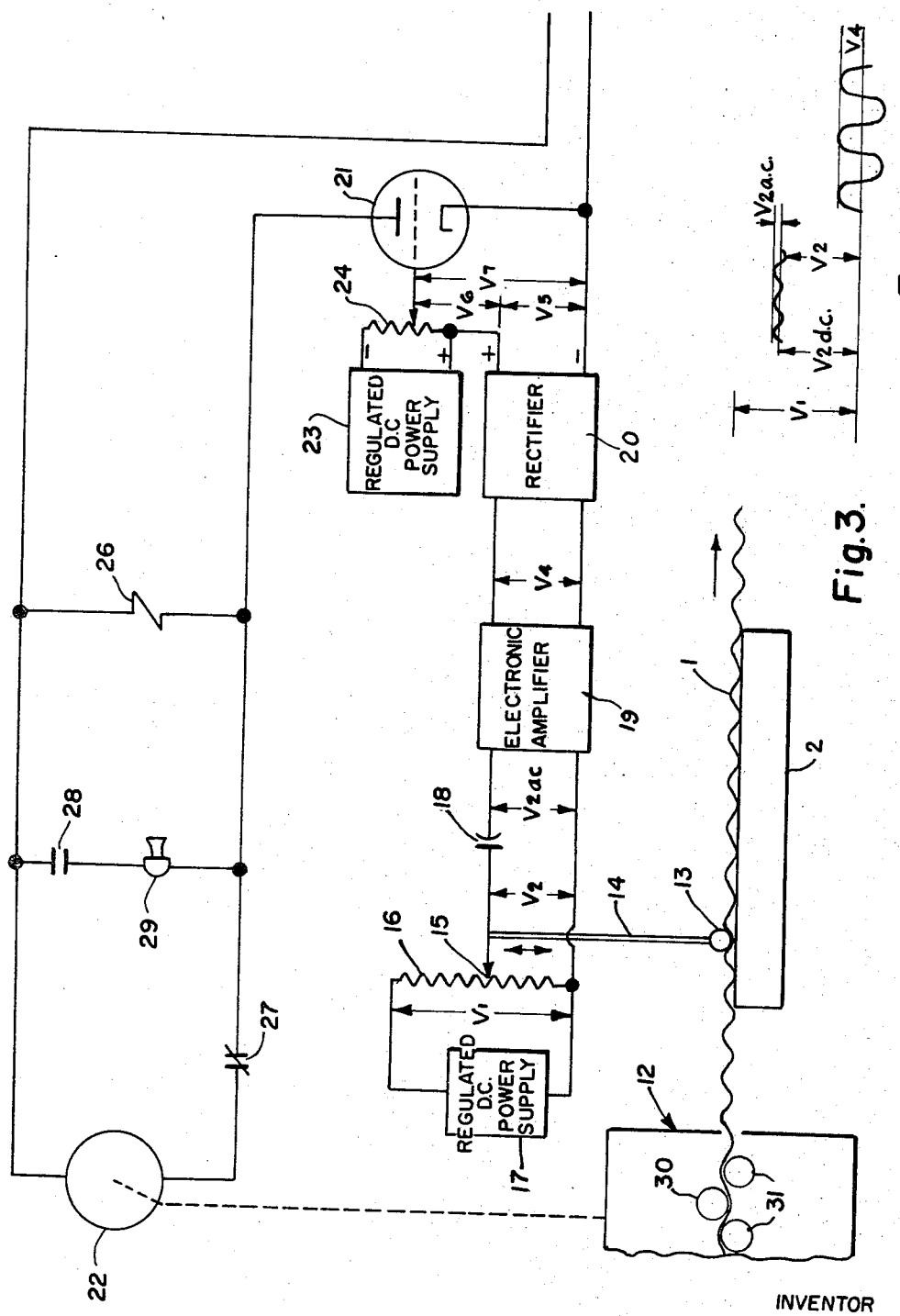

Dec. 17, 1968 J. W. REESOR 3,416,340
AUTOMATIC CONTROL AND INDICATING SYSTEMS FOR ROLLER LEVELERS
Filed June 8, 1966 3 Sheets-Sheet 3

INVENTOR.
JAMES W. REESOR
BY
*William J. Ruano*
his ATTORNEY

United States Patent Office 3,416,340
Patented Dec. 17, 1968

3,416,340
AUTOMATIC CONTROL AND INDICATING
SYSTEMS FOR ROLLER LEVELERS
James W. Reesor, Allison Park, Pa., assignor to Voss
Engineering Company, Callery, Pa.
Filed June 8, 1966, Ser. No. 556,042
7 Claims. (Cl. 72—12)

This invention relates to an automatic control system for detecting and controlling ripples or irregularities from the surface of a sheet or strip as it passes through strip leveling devices, such as roller levelers in a continuous sheet or strip processing line.

In the past, roller levelers have been used for straightening or flattening a continuous metal sheet or strip while traveling in a processing line, such as a galvanizing line. A long existing problem has been to accurately detect ripples or irregularities formed in the sheet so that proper manual adjustments could be made in the roller levelers to restore the sheet to flat condition. One serious problem has arisen from the fact that a flatness gauge or sensing device for detecting such irregularities, which is of the type that physically contacts the strip, has certain fundamental objections, such as very often giving faulty responses as the result of the vibration and friction developed from sliding contact with the strip, as well as marring of the surface of the strip.

Prior systems generally involve flatness gauges which give a visual indication of irregularities in the sheet, as the result of which the operator makes manual adjustments in the roller leveler in an endeavor to overcome the irregularities. This has the outstanding disadvantage of requiring an alert operator to continually watch the flatness gauge and who must, by trial and error, adjust the roller levelers in an attempt to restore the sheet to flat condition.

Experience has shown that often times, very long lengths of sheets go by with irregularities which are not noticed, thus causing a considerable amount of scrap, which appreciably increases the cost of production.

An object of my invention is to provide an automatic control system which will overcome the disadvantages of the abovementioned prior devices by giving an accurate visual indication of irregularities in sheets or strips going through a roller leveler without marring the sheet, also which will automatically control the adjustment of roller levelers in response to the degree of irregularity, so as to quickly restore the sheet or strip to flat condition.

Another object of the present invention is to provide a novel flatness gauge for sheet and strip material, which gauge is not required to be in contact with, or very closely adjacent the sheet or strip material, thus overcoming the disadvantages inherent from physical contact or close proximity to the sheet or strip.

A more specific object of the present invention is to provide a novel flatness gauge embodying reflected light that will give a very clear and magnified image on a television screen to indicate the precise amplitude and disposition of ripples or irregularities in a continuous sheet of a processing line so that they may be overcome either manually or automatically and restored to flat condition by adjustment of the roller leveler, which screen is more easily read and may be remotely located for facilitating inspection and leveler control.

Other objects and advantages will become more apparent from a study of the following description taken with the accompanying drawings wherein:

FIG. 1 is a perspective view of a flatness gauge requiring no contact or close proximity to the sheet or strip and embodying the present invention;

FIG. 1a is a fragmentary side view thereof;

FIG. 2 is a schematic view showing the path of light and the manner ripples of the sheet are detected;

FIG. 3 is an electrical schematic diagram showing an automatic control system for giving an audible signal, responsive to irregularities of the sheet, and which simultaneously automatically controls the adjustment of the roller leveler so as to quickly overcome irregularities and restore the sheet to flat condition; FIG. 3a shows voltages;

Figure 8:
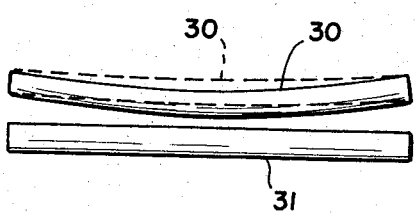
Figure 9:
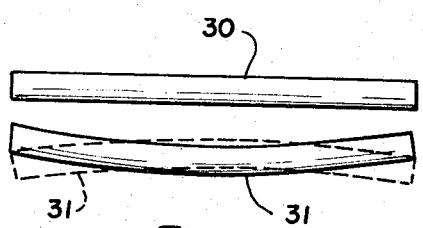
Figure 10:
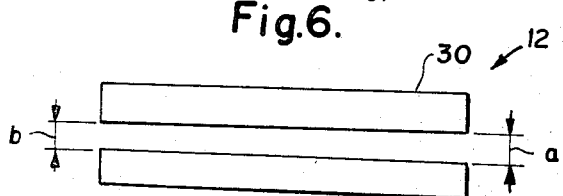
Figure 11:
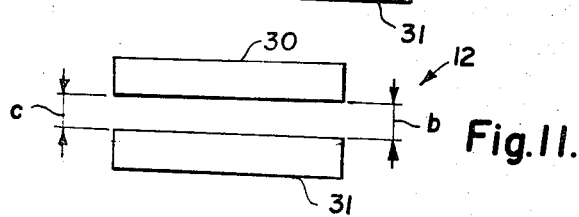

FIGS. 6 to 9 inclusive show various adjustments made on the rolls of the roller leveler to flatten the sheet; and FIGS. 10 and 11 show angle $a > b > c$.

Referring more particularly to FIG. 1, numeral 1 denotes a fragmentary portion of a continuous strip or sheet moving longitudinally on the top of a flat reference table 2, forming portion of a continuous strip processing line, such as a galvanizing line, which includes a plurality of roller levelers (not shown) of well known type. A light line or rectangular area 3 emanating from a parallel light beam source 4 is projected on the top surface of the sheet or strip 1. The light beam forms an angle $\theta$ with the surface of sheet 1.

When sheet 1 is flat, as it normally should be, light line 3 is straight. However, when the strip surface deviates from a flat condition by a distance $y$, as shown in FIG. 1A, the light line is displaced horizontally a proportional distance $x$.

This irregularity is detected by a television camera 4A, of well known construction, which views the strip surface area $a \times b$ in FIG. 2. The image of this area is projected onto the camera scanning grid by the camera's optical system. This image is scanned by the camera at a rate of 30 times (frames) a second, for example. Each frame may be composed of approximately 500 scanning lines, such as denoted by numeral 5 in FIG. 2, generated by the scanning dot in the camera moving in the direction shown by the arrows on scanning lines 5.

These scanning lines 5 are oriented in a direction perpendicular to light line 3, shown in FIG. 2. As the scanning dot in the camera generates a scanning line, it always starts from reference line 6 in the camera and moves away from it at the same speed to reference line 7.

Contrasting light levels on the lighted and unlighted areas of the strip are such so that when the scanning dot strikes the lighted line, the camera signals this event. Thus the time required for the scanning dot to move from the reference line to the light line is a measure of a difference between the two lines.

On a flat sheet, these two lines are parallel and the reference line is straight, therefore, any displacement of the light line from a straight condition caused by non-flat strip areas will cause a variation in the time it takes the scanning dot to move from the reference line to the light line.

Therefore, it will be apparent that strip width plotted versus scanning line times between the reference line and light line during a given frame is a plot of strip flatness profile during the frame.

This plot is normally displayed on the screen of television camera 4A. However, it should be noted that by connecting the television camera to an automatic control system for automatically adjusting a strip leveling device, automatic control of flatness of the strip 1 is obtained, which control system will be described hereinafter in connection with a modified gauge sensing device to more clearly illustrate the operation of the control system.

To provide a more noticeable flatness profile on the television screen, the deviations from flat should be magnified before their display to provide greater accuracy in visual detection. This can be done with well known electronic circuits normally used to magnify pulses displayed on oscilloscopes.

The gauge may be used for automatic control of adjustment of the strip leveling devices, such as roller levelers. This requires electronic circuit measurement of the scanning dot times between the reference line 6 and light line 7. Such circuits for measuring time of this magnitude as well known and now extensively used in oscilloscopes, and are suitable for the present gauge.

A modification of the invention comprises a computer (not shown) that will convert flatness profile readings into signals for automatically controlling strip leveling equipment to provide the necessary control action required for acceptable strip leveling. The computer requirements may be learned from results obtained by manual control of strip levelers based on visual displays of strip flatness profiles on the television screen of TV camera 4A.

A flatness profile reading over the entire surface may be obtained by movement of the camera 4A and source 4 as a unit relative to the strip. At a relative speed of 1200 ft. per minute, a flatness profile plot may be obtained every 8 inches of strip length. Each plot would consist of 500 readings, one for each scanning line or one every 0.144 inch of strip width on a 72 inch wide strip. The speed of the relative motion must be fairly constant for accurate flatness readings.

The tension on the strip must be low or substantially zero to obtain accurate flatness reading. Therefore, the use of the present gauge in a continuous strip process line would require lowering of the tension on the strip to a minimum required to maintain strip motion. This, however, would be necessary only in that part of the line where flatness measurements are made.

FIG. 3 shows an automatic control system for use with an inspection table 2 for controlling the roller leveler adjustment automatically to eliminate minor ripples at the strip center or edges after the leveler has been first adjusted manually to provide a flat strip at the start of the strip coil.

While the television flatness gauge scheme shown in FIGS. 1 and 2 may be used in the control system of FIG. 3 as a flatness detector, it should be noted that other flatness detectors may be used instead, such as the follower potentiometer shown in FIG. 3.

When the sheet or strip 1 is moved under a fixed reference point in a fixed plane, the distance between the reference point and strip surface varies as the strip ripple. Such ripple causes the control to generate an alternating or pulse voltage corresponding to the ripple. This voltage is amplified and fed to the leveler adjustment motor so as to properly adjust the leveler to eliminate the ripple and flatten the strip. When the strip is flat, there is no ripple to generate a voltage to run the adjustment motor.

As the strip or sheet is longitudinally moved in the line, its shape as it approaches the leveler may vary. If it does, the leveler operator must monitor the flatness of the outgoing strip from the leveler visually and make minor re-adjustments of the leveler to obtain flatness of the strip.

By the present invention, shown in FIG. 3, such monitoring and minor re-adjustment is done automatically and quickly by the control system.

In the event the range of adjustment required is beyond the system's capability, further adjustment is discontinued and an alarm is sounded, both automatically. The system is turned back on again after the required leveler adjustments have been done by manual operation of the leveler adjusting control.

Referring more particularly to FIG. 3, after the metal strip or sheet 1 has been flattened in the roller leveler 12, it is passed at uniform speed over the flat reference table 2 under minimum tension required to keep it in motion. A follower wheel 13 rides up and down over the ripples in the strip 1 so as to impart a vertical oscillating motion to a rod 14 containing the follower wheel axle. Rod 14 is attached to an adjustable or sliding contact 15 on a linear potentiometer 16. A fixed DC voltage V1 is applied across the potentiometer by a regulated power supply 17. Since the potentiometer 16 is linear and the voltage across the resistor is fixed, the voltage between the base of the potentiometer 16 and sliding contact 15 will vary in proportion to the position of the sliding contact 15 as it is vertically oscillated by the rippled sheet.

A voltage V2 across the potentiometer base and its slide contact 15 has an alternating current component V2 A.C. whose frequency is proportional to ripple crest spacing and strip speed and whose amplitude is proportioned to ripple height. Voltage V2 has also a direct component V2 D.C. proportional to the average position of slider contact 15 above the potentiometer base.

Turning to FIG. 3, capacitor 18 blocks V2 D.C. but passes the A.C. voltage component V2 A.C. onto electronic amplifier 19. After amplification, the A.C. output voltage V4 passes through rectifier 20 and is rectified to form D.C. voltage V5 which is connected in series-opposition with the fixed grids bias voltage V6 of a Thyratron or other grid-controlled vacuum tube through which A.C. current is supplied to the leveler adjustment motor 22. The bias voltage is supplied by the regulated D.C. power supply 23. Of course, other electronic control devices, such as transistors or the like, could be substituted for Thyratron 21.

When strip 1 is flat and no ripple signal voltage is present, the grid voltage V7 is at a value so as to prevent conduction of electric current to tube 21, therefore, the leveler adjustment motor does not run.

However, when the ripple voltage output rises to a predetermined value corresponding to a preselected minimum ripple, grid voltage V7 decreases to a value to permit the Thyratron to conduct current, whereby the leveler adjustment motor 22 runs to adjust the leveler so as to eliminate the ripple. When the ripple is gone, there is no longer a voltage output from the ripple detector. The bias voltage on the Thyratron will then be increased until tube 21 stops conducting and the level adjustment motor 22 stops.

Sensitivity potentiometer control resistor 24 provides a means for varying the bias voltage of tube 21 to vary the system sensitivity. A lower bias voltage requires a lower ripple detector signal voltage to cause the Thyratron to conduct. A lower signal voltage requires a smaller ripple to generate it, hence as the bias voltage is decreased, the ripple detector sensitivity increases, and vice versa.

A time delay relay 26 is also eneregized by the output of tube 21 when it conducts. If after a preselected time, the ripple has not been eliminated, the relay times out so as to open contact 27 and close contact 28 so as to stop the adjustment motor 22 and complete a circuit through alarm 29 or perhaps a lamp or other visual indicator, or both.

Figure 4:
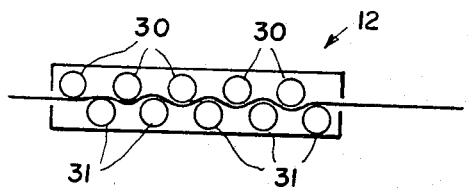
FIGS. 4 and 5 are side and perspective views schematically showing a roller leveler.
Figure 7:
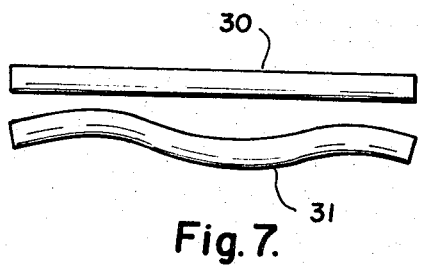
Figure 5:
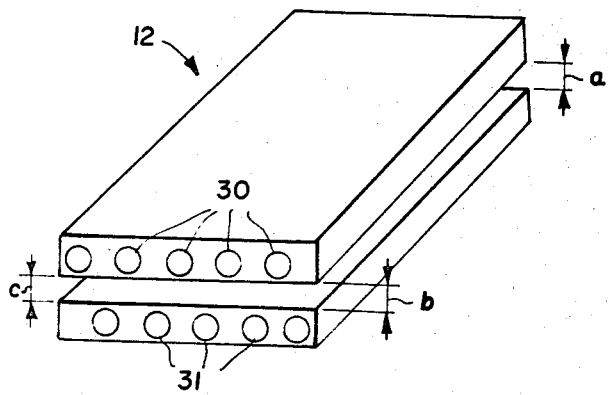
Figure 6:
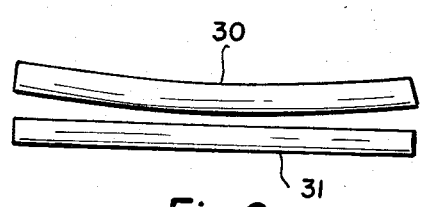

FIGS. 4 to 9 inclusive schematically show how the automatic control system described can be used to adjust the leveler in a manner to eliminate strip ripple. A leveler 12 consists essentially of two decks of parallel rolls in staggered relationship, 30, 31, as shown in FIG. 4. The strip moving between these decks of rolls is flexed as shown. Adjustments are provided for tilting one deck of rolls with respect to the other, as shown in FIG. 5. Also the centers of the top rolls 30 can be flexed down by a roll bend adjustment, as shown in FIG. 6, and the bottom rolls 31 can be flexed by independent roll bend adjustments at points along their lengths to various configurations, as shown in FIG. 7. This makes it possible to flex some parts of the strip more than others with the rolls, as is necessary to flatten the strip properly. All such adjustments are motor driven. A detailed mechanical construction for effecting the adjustments described is shown in the copending application of Gerald L. Bearer, Ser. No. 377,334, filed June 23, 1964, now Patent No. 3,301,031, assigned to the present assignee, of which the present application is a continuation-in-part. FIGS. 10 and 11 show angle $a > b > c$.

By far the most common defect in outgoing strip flatness, caused by variations in incoming strip shape after the leveler has been adjusted initially for a strip run, is the occurrence of a minor ripple along the strip edge or center. Therefore, a method of utilizing the automatic leveler control described to control the leveler for elimination of such ripples will be described.

In operation, the leveler is assumed to have been adjusted so that the sheet is being flattened properly and then the automatic control system is turned on. Should a slight ripple appear at the strip center, a slight decrease in the top roll bend will eliminate it. A ripple detector placed at the center of the strip would detect the ripple and generate a voltage. This voltage is utilized, as described above, to cause the roll bend adjustment motor to decrease the center roll bend in the top rolls, as shown in FIG. 8, which eliminates the ripple.

If a minor ripple appears at the edge of a strip, it can be eliminated by actuating the proper leveler adjustment motor with the control system to decrease the outboard roll bend and increase the inboard roll bend in the bottom roll, as shown in FIG. 9.

The signal obtained from the ripple detector is dependent only upon a ripple being present or absent and on the speed of the sheet. No detector calibration is needed to compensate for leveler wear or variations in sheet thickness. This provides a very substantial advantage from the standpoint of operation and maintenance. Instead of the non-flatness or ripple detectors shown in FIGS. 1–3, other ripple detectors may be used in the control system, for example, proximity switches and a reflected light system wherein reflected light from the rippled surface alternately strikes and misses a photo-electric cell. This cell would generate a voltage pulse each time the light struck it. Other well known means may be used to amplify the sensor voltage to run the adjustment motor.

Thus it will be seen that I have provided a highly efficient detector for sensing the presence of ripples that may occur in longitudinally moving continuous metal strips or sheets, in a galvanizing line or the like, without the necessity of contacting and marring the surface of the sheet and without being subject to vibrations and friction which tend to introduce errors in detection of the ripples; furthermore, I have provided an automatic control system which is quickly responsive to the presence of ripples in a continuous moving sheet to generate a control voltage which is effective to cause starting and stopping of the adjustment motor of a roller leveler to compensate the adjustment so as to effect flattening of the sheet.

While I have illustrated and described several modifications of my invention, it will be understood that these are by way of illustration only, and that various changes and modifications may be made within the contemplation of my invention and within the scope of the following claims.

I claim:
1. In combination with a continuous sheet processing line including a sheet leveling device through which a longitudinally moving sheet is passed to flatten the sheet, means for detecting at least a portion of the width of the sheet for the presence of ripples, and means responsive to said detecting means for indicating the portion of the width of the sheet in which the ripple is present.

2. The combination recited in claim 1 wherein said detecting means includes a light source which projects a straight beam of light across the width of the strip, and wherein said indicating means comprises a television camera which scans and gives a visual amplified image on its screen of said beam of light to display the position and amplitude of said ripple.

3. The combination recited in claim 2 together with an inspection table over which said sheet is passed at substantially zero tension and detected by said detecting means.

4. The combination recited in claim 1, together with motor means for adjusting said sheet leveling device, said motor means being responsive to said detecting means so as to automatically operate to restore the rippled sheet to flat condition.

5. The combination recited in claim 4, wherein said sheet leveling device comprises a roller leveler having motor-driven adjusting means for suitably bending the rolls of said roller leveler to restore the rippled sheet to flat condition.

6. The combination recited in claim 4, wherein said detecting means includes sensor means for sensing ripples in the sheet and electronic means responsive thereto, said electronic means including an amplifier whose output voltage is applied to said motor-driven adjusting means for suitably adjusting the rolls of the roller leveler so as to restore the sheet to the flat condition.

7. The combination recited in claim 4, together with an inspection table over which the sheet passes with substantially no tension, and whereon said sheet is detected for the presence of ripples.

References Cited

UNITED STATES PATENTS

| 3,096,670 | 7/1963 | Stringer | 72—16 |
| 3,180,122 | 4/1965 | Evans et al. | 72—12 |
| 3,212,127 | 10/1965 | Flook et al. | 72—16 |

CHARLES W. LANHAM, *Primary Examiner.*

R. D. GREFE, *Assistant Examiner.*

U.S. Cl. X.R.

72—16, 17, 164, 701